June 9, 1959 A. L. A. FEYZEAU 2,890,280

DISTANT SYNCHRONISATION OF TELEVISION EQUIPMENT

Filed Dec. 2, 1953 2 Sheets-Sheet 1

INVENTOR
Andre L.A. Feyzeau
By Ralph B. Stewart
attorney

DISTANT SYNCHRONISATION OF TELEVISION EQUIPMENT

Filed Dec. 2, 1953 2 Sheets-Sheet 2

INVENTOR
Andre L.A. Feyzeau
By Ralph B. Stewart
attorney

United States Patent Office 2,890,280

Patented June 9, 1959

2,890,280

DISTANT SYNCHRONISATION OF TELEVISION EQUIPMENT

André Louis A. Feyzeau, St. Maur des Fosses, France, assignor to Societe Nouvelle de l'Outillage R.B.V. et de la Radio-Industrie (R.B.V.-R.I.), Paris, France, a joint-stock company Application December 2, 1953, Serial No. 395,706

Claims priority, application France December 5, 1952

8 Claims. (Cl. 178—69.5)

It is well known that the synchronisation of a camera equipment or of an outdoor pick-up unit of television has to be carefully controlled by a monitoring station so that the scanning of the pick-up tubes would be in precise register with the synchronisation pulses which are added to the video signal before it is transmitted. It is very important that both the frequency and the phase of the synchronisation signals should be controlled to insure a good quality picture on the receivers. The precise control of the synchronisation pulses in different video channel from a single monitoring station is a rather difficult problem since it is necessary that the synchronisation should be efficient both for line connected channels such as camera channels and for mobile and sometimes remote outdoor units. On the other hand, it is not sufficient that the frequency of the line or field scanning should be precise but it is necessary that it should follow the phase fluctuations which may occur at the monitoring station.

It is an object of the invention to provide high precision synchronisation controlling means for both still and mobile units.

It is another object of the invention to provide means whereby both the frequency and the phase of the synchronisation pulses may be controlled with a high precision.

It is another object of the invention to provide means whereby the scanning of a far distant television unit may be controlled with high precision, both in frequency and in phase.

According to the invention, a sinusoidal signal the frequency of which is a sub-harmonic of twice the line scanning frequency is sent to each camera channel from an auxiliary station so as to synchronise each synchronisation generator and the phase of the synchronising pulses generated by each of said channel generators is compared with the phase of a set of pulses delivered by a common monitor so as to correct the phase of said sinusoidal signal to reduce said outphasing to a very small value.

The invention will be better understood by reference to the following description of the invention with the accompanying drawings.

On Figure 1 are shown the different units which are used in a two-channel television broadcasting system.

As shown, each video chain comprises a camera including the pick-up tube, the optical system and the scanning coils, and pre-amplifier. The scanning is controlled by a synchronisation generator (syn. gen.). The optics of the camera and the focussing are controlled by the operator by means of the view-finder and the control camera unit. The video output of channel (1) is sent by cable to the mixing equipment when the camera chain is in a studio near said equipment. As seen, the video output of camera channel (2) is sent by a U.H.F. link to the mixing equipment. That is the case for distant studios or outdoor broadcast units. The mixing equipment comprises as many monitor receivers as the number of video channels and a selecting unit which sends to the transmitter, at each moment, the video signal of a particular channel. The selecting unit feeds the transmitter by means of a cable or a U.H.F. link.

The video signal is first rearranged at the transmitter that is to say the picture modulation is separated from synchronisation pulses in the separator stage and both are independently amplified respectively in the video amplifier and the pulse shaping networks. The shape of the pulses is corrected and the blanking signals are introduced, or new synchonisation pulses are fed to the amplified signal. In any case, it is necessary that the frequency and phase of the synchronisation signals be in precise register in all the camera channels which are connected to the mixing equipment so that the pulse shaping be correct at the transmitter and the introduction of the blanking signals be possible.

Figure 1:
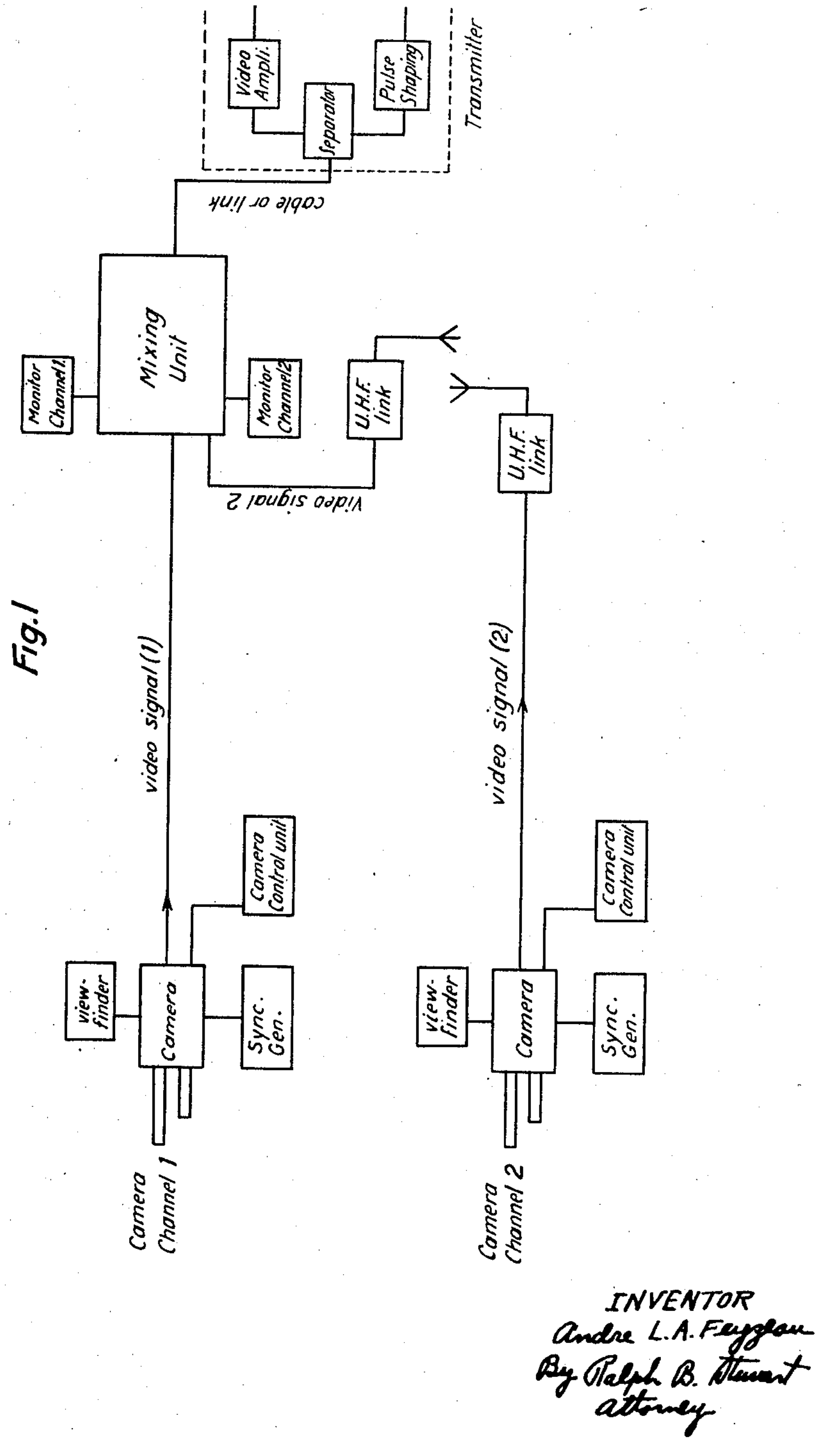
Figure 1 shows the different units with which the invention is related and constituting two camera channels feeding the same transmitter by means of a mixing equipment.
Figure 2:
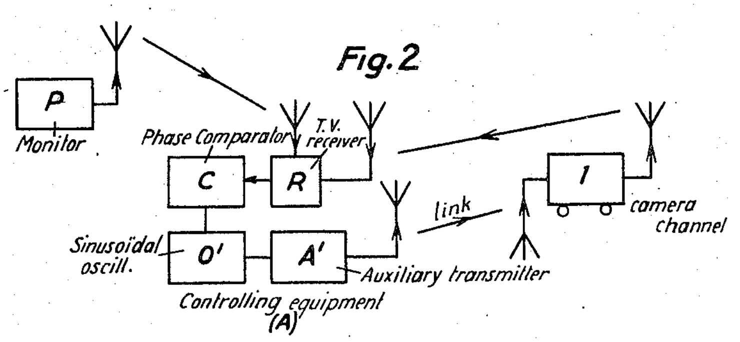
Figure 2 shows the arrangement for carrying out the frequency controlling process according to the invention.

Figure 2 shows how the precise registration of the synchronisation pulses in the different camera channels or slave units is obtained according to the invention.

By way of simplification, there is only shown in Figure 2, one slave unit 1 shown schematically as a vehicle just to indicate that said camera channel may be mobile with respect to the monitoring unit P. Usually, of course, there are many slave units such as 1 controlled from monitoring station P, which are either fixed or mobile.

According to the invention, an auxiliary equipment indicated generally at A is used comprising a sinusoidal oscillator O′ the frequency which is very low with respect to the carrier frequency used either at P or at 1 to transmit the communication signals. The frequency of O′ is a sub-harmonic of twice the frequency of the line synchronisation signals, around a few kilocycles. Oscillator O′ amplitude modulates auxiliary transmitter A′ which transmits a control wave to slave unit 1. The carrier frequency and the power output of transmitter A′ are chosen so as to insure a reliable link between auxiliary device A and the slave units such as 1, etc. They will, of course, have to be carefully selected for each particular application according to the nature of the geography between device A and the slave units such as 1.

At the slave unit 1 is located a receiver which detects the signal transmitted from A′. The resultant sinusoidal oscillation is used to control the frequency of the local synchronising pulse generator as will be understood by reference to Figure 4.

The slave unit 1 transmits a complex television signal which is received and detected in an auxiliary receiver R included in equipment A. This receiver detects also the monitoring signal which is transmitted by monitoring station P and the synchronising pulses of both incoming signals are separated in the receiver by pulse separators *Sa* and *Sb*. Both sets of synchronising signals are fed from *Sa* and *Sb* to phase comparator circuit C, the output of which controls the phase of sinusoidal oscillator O′, for instance by means of a small condenser *Co* which is introduced in the tank circuit of said oscillator. The adjustment of said condenser is obtained by means of a servomotor SM controlled by phase comparator circuit C, so that the out-phasing or mis-phasing between the two sets of synchronising pulses tends to drop to zero.

Some of the circuits which are shown on Figure 2 may be rearranged so as to reduce the number of the circuits which constitute the auxiliary controlling equipment A. As was said, all the camera channels feeding the same mixing equipment should deliver video signals the synchronisation pulses of which are in precise register. Auxiliary oscillator O′ and transmitter A′ and their controlling circuit C should be located in the mixing equipment where phase comparator C receives directly the monitoring signals from monitoring unit P which is the general synchronisation generator. Control receiver R which is used to detect the picture signal sent back to the mixing equipment by each camera channel exists all ready in the equipment as a monitor receiver, so that it is not necessary that special auxiliary receivers be used for the line synchronisation frequency control.

Figure 3:
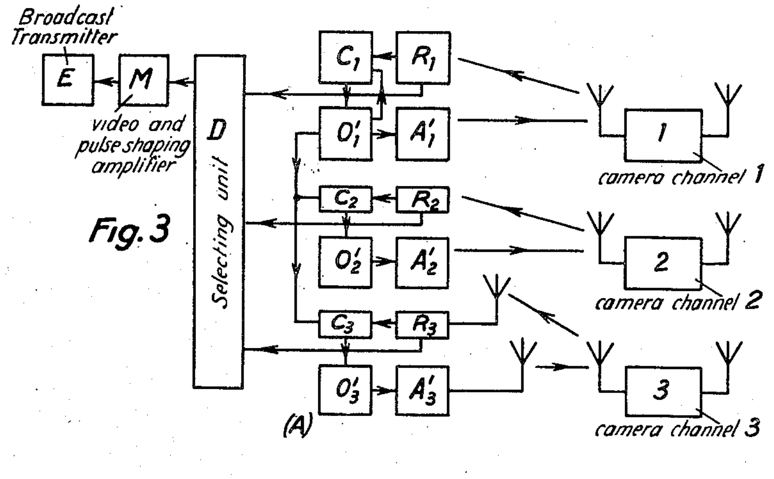
Figure 3 shows an arrangement of the frequency controlling unit according to the invention.

As shown in Figure 3, it is necessary to provide a controlling equipment A for each separate camera channel. This figure corresponds to the case when three camera channels 1, 2, 3 are considered. Each one is connected by means of a radio or cable link to the mixing equipment where are located the frequency controlling means according to the invention. As shown, the monitor receivers $R_1$, $R_2$ . . . of the mixing equipment are used as control receivers for the synchronisation pulse frequency control. The external monitor P is oscillator $O'_1$ of the frequency control channel associated with camera channel 1. Each of the auxiliary transmitters $A'_1$, $A'_2$, $A'_3$ works on a different frequency to which is tuned the auxiliary receiver of the associated video channel equipment. When the controlling equipment is located at the mixing equipment, receivers $R_1$, $R_2$ . . . feed directly the selecting unit D connected to the television broadcast transmitter E, by means of the video amplifier and pulse shaping network M. When some of the camera channels are located near the mixing equipment, auxiliary transmitters $A'_1$, $A'_2$ . . . and auxiliary receivers in the camera equipments are not necessary since the link between sinusoidal oscillator O′ and the synchronisation generator of the video channel equipment is obtained by means of a cable.

Figure 4:
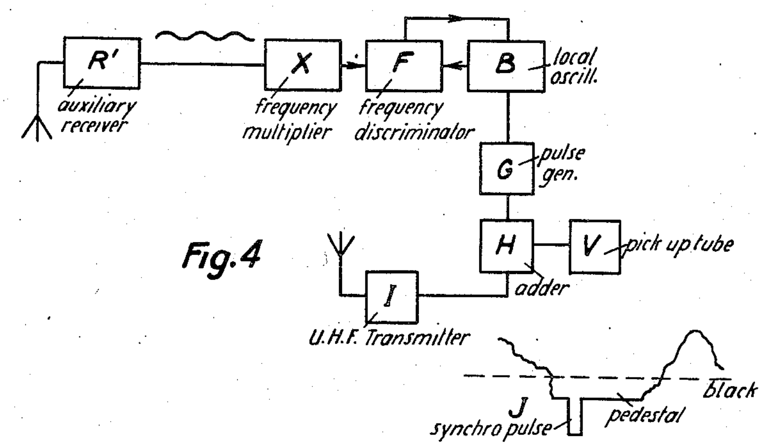
Figure 4 shows details of the arrangement at the individual slave or camera channel stations according to the invention.

Figure 4 shows schematically the networks constituting the synchronisation generator of a slave unit or camera channel. Auxiliary receiver R′ is tuned to one of the auxiliary transmitters $A'_1$, $A'_2$ . . . and delivers the low frequency sinusoidal oscillation supplied by the associated oscillator O′ in the control equipment A. As was said, the frequency of this oscillation is sub-harmonic with respect to twice the line synchronisation frequency. The sinusoidal oscillation is fed to a frequency multiplier X which delivers a sinusoidal oscillation, the frequency of which is twice the synchronisation line frequency. Frequency multiplier X is made for instance of four frequency tripler stages of the tuned type. The controlling oscillation is compared in the frequency discriminator F, of the Seeley type, to the frequency of the local oscillator B. The output signal from F controls the frequency of B, by means of a reactance tube which is part of the tuned circuit of local generator B, as is usual. Line synchronisation pulse generator G is directly controlled by B. According to a preferred feature of the invention, the pedestal level of the line synchronisation pulses is blacker than the black video level as shown on curve J. This feature is intended so as to make it easier at the monitor receivers R to separate the synchronisation signals from the modulation signal. The pulses delivered by generator G are added in adder stage H with the video signals from the pick-up tube V and sent back to the mixing equipment by the U.H.F. transmitter I.

The phase stabilisation which is obtained according to the invention is very accurate owing to the frequency multiplication in frequency multiplier X as will be readily understood. A small variation in the phase of the low frequency controlling oscillation from O′ is multiplied in X and corresponds to a large phase displacement of the controlling signal of local generator B.

In a particular embodiment of the circuit shown on Figures 3 and 4, the phase displacement between the line synchronisation pulses from two separate camera channels is kept within one degree, four minutes.

What I claim is:

1. A remote control equipment for synchronising multiple television camera channels with a single monitoring station comprising, for each camera channel, means for generating at the monitor and transmitting of each channel low frequency sinusoidal control oscillations, phase controlling means for controlling the phase of one of said oscillations, a television receiver tuned to the television signal from said single monitoring station including a synchronising pulse separator, a receiver tuned to one of the camera channel signals including a synchronising pulse separator, a phase comparator, means for feeding said phase comparator from both of said synchronising pulse separators, means for connecting said phase comparator to said phase controlling means, means for transmitting said low frequency oscillations selectively to said camera channels and, in each of said camera channels, receiving means for said control oscillations including, phase sensitive means for detecting the phase modulated control oscillation selectively received in each camera channel, and means for synchronising the line synchronising pulse generator in each camera channel with the received control oscillation.

2. A remote line synchronisation control equipment for multiple television camera channels comprising, for each camera channel, means for generating a sinusoidal control oscillation the frequency of which is sub-harmonic of twice the line synchronisation pulse frequency, means for controlling the phase of said oscillation, a television receiver tuned to a single monitoring television signal including a line synchronisation pulse separator, a television receiver tuned to one of the camera channels signal including a line synchronisation pulse separator, a phase comparator, means for connecting said phase comparator to both said line synchronisation separators, means for connecting said phase comparator to said phase controlling means, means for transmitting said low frequency oscillation to a camera station, and, in each camera station, receiving means for detecting said phase modulated control oscillation, and means for synchronising the line synchronisation pulse generator with said control oscillation.

3. A remote line synchronisation control equipment for multiple television camera channels comprising, for each camera channel, means for generating a sinusoidal control oscillation the frequency of which is sub-harmonic of twice the line synchronisation pulse frequency, means for controlling the phase of said oscillation a television receiver tuned to a single monitoring television signal including a line synchronisation pulse separator, a television receiver tuned to one of the camera channels signal including a line synchronisation pulse separator, a phase comparator, means for connecting said phase comparator to both said line synchronisation separators, means for connecting said phase comparator to said phase controlling means, means for transmitting said low frequency oscillation to a camera station, and, in each camera station, receiving means for detecting said phase modulated control oscillation, frequency multiplying means for said received control oscillation, a local pulse generator operating at twice the line synchronisation frequency, and frequency discriminating means for controlling the frequency of said local generator.

4. A remote line synchronisation control equipment for multiple television camera channels comprising, for each camera channel, means for generating a sinusoidal control oscillation, the frequencies of which are the same sub-harmonic of twice the line synchronisation pulse frequency, means for controlling independently the phase of said oscillation, a television receiver tuned to a single monitoring television signal common to all channels and including a line synchronisation pulse separator, a television receiver tuned to one of the camera channels signal including a line synchronisation pulse separator, a phase comparator, means for connecting said phase comparator to both said line synchronisation separators, means for connecting said phase comparator to said phase controlling means, means for transmitting said low frequency oscillation to a camera station, and, in each camera station, receiving means for detecting said phase modulated control oscillation, and means for synchronising the line synchronisation pulse generator at the station with said control oscillation.

5. A remote synchronisation control equipment for multiple television camera channels comprising, single means for generating a low frequency sinusoidal monitoring oscillation for all channels, and for each television channel, means for generating a low frequency sinusoidal control oscillation, means for controlling the phase of said control oscillation, a monitor receiver tuned to said camera channel including a synchronisation pulse separator, a phase comparator, means for connecting said phase comparator to said monitoring oscillation generating means and to said pulse separator, means for connecting said phase comparator to said phase controlling means, means to modulate the phase of said control oscillation for transmitting said phase-modulated low frequency oscillation to a camera station, and, in each camera channel, receiving means for detecting said phase modulated control oscillation, and means for synchronising the synchronisation pulse generator at said station with said control oscillation.

6. A remote synchronisation control equipment for television camera channels such as recited in claim 4 in which said monitoring oscillation generating means is the control oscillation generator for one of the camera channels.

7. A remote line synchronisation equipment for television camera channels comprising a single means for generating a low frequency sinusoidal monitoring oscillation for all channels the frequency of which is a subharmonic of twice the line synchronisation pulse frequency, and for each television channel, means for generating a sinusoidal control oscillation the frequency of which is a sub-harmonic of twice the line synchronisation frequency, means for controlling the phase of said control oscillation, a monitor receiver tuned to said camera channel including a line synchronisation pulse separator and a phase comparator, means for connecting said phase comparator to said monitoring oscillation generating means and to said pulse separator, means for connecting said phase comparator to said phase controlling means, means for transmitting said low frequency oscillation to a camera station, and in each camera station, receiving means for detecting said phase modulated control oscillation, and means for synchronising the line synchronisation pulse generator at said station with said control oscillation.

8. A remote line synchronisation equipment for television camera channels comprising a single means for generating a low frequency sinusoidal monitoring oscillation for all channels the frequency of which is a subharmonic of twice the line synchronisation pulse frequency, and, for each television channel, means for generating a sinusoidal control oscillation the frequency of which is the same sub-harmonic of twice the line synchronisation frequency, means for controlling the phase of said control oscillation, a monitor receiver tuned to said camera channel including a line synchronisation pulse separator, a phase comparator, means for connecting said phase comparator to said monitoring oscillation generating means and to said pulse separator, means for connecting said phase comparator to said phase controlling means, means for transmitting said low frequency oscillation to a camera station, and, in each camera station, receiving means for detecting said phase modulated control oscillation, and means for synchronising the line synchronisation pulse generator at said station with said control oscillation.

References Cited in the file of this patent

UNITED STATES PATENTS

| | | |
|---|---|---|
| 2,278,788 | Knick | Apr. 7, 1942 |
| 2,414,453 | France | Jan. 21, 1947 |
| 2,570,775 | De Baun | Oct. 9, 1951 |
| 2,597,743 | Millspaugh | Apr. 20, 1952 |
| 2,686,833 | Baracket | Aug. 17, 1954 |